US012583681B2

(12) United States Patent
Yamashita et al.

(10) Patent No.: US 12,583,681 B2
(45) Date of Patent: Mar. 24, 2026

(54) METHOD AND STATION FOR PICKING ARTICLES ACCORDING TO THE GOODS-TO-MAN PRINCIPLE

(71) Applicant: Dematic GmbH, Heusenstamm (DE)

(72) Inventors: Shin Yamashita, Oberursel (DE); Yuuki Kudo, Tokyo (JP); Adam MacLean, Ryde (AU)

(73) Assignee: Dematic GmbH, Heusenstamm (DE)

( * ) Notice: Subject to any disclaimer, the term of this patent is extended or adjusted under 35 U.S.C. 154(b) by 704 days.

(21) Appl. No.: 17/923,759

(22) PCT Filed: May 8, 2020

(86) PCT No.: PCT/EP2020/062887

§ 371 (c)(1),
(2) Date: Nov. 7, 2022

(87) PCT Pub. No.: WO2021/223881

PCT Pub. Date: Nov. 11, 2021

(65) Prior Publication Data

US 2023/0183008 A1     Jun. 15, 2023

(51) Int. Cl.
*B65G 1/137*          (2006.01)
*B65G 17/32*          (2006.01)
          (Continued)
(52) U.S. Cl.
CPC ........... *B65G 1/1378* (2013.01); *B65G 17/32* (2013.01); *B65G 43/10* (2013.01); *B65G 47/905* (2013.01); *B65G 2209/02* (2013.01)
(58) Field of Classification Search
CPC ...... B65G 1/1378; B65G 43/10; B65G 17/32; B65G 47/905; B65G 2209/02
See application file for complete search history.

(56) References Cited

U.S. PATENT DOCUMENTS

2006/0229762 A1*  10/2006  Schaefer .............. B65G 1/1378
                                                        700/216
2012/0282068 A1   11/2012  Tschurwald et al.
                        (Continued)

FOREIGN PATENT DOCUMENTS

DE          10200077 A1    12/2002
DE          10136354 B4     6/2010
                  (Continued)

OTHER PUBLICATIONS

International Search Report and Written Opinion of the International Searching Authority in English from corresponding Patent Cooperation Treaty (PCT) Application No. PCT/EP2020/062887, indicated completed on Jan. 18, 2021.

*Primary Examiner* — Thomas Randazzo
(74) *Attorney, Agent, or Firm* — Gardner, Linn, Burkhart & Ondersma LLP

(57)          ABSTRACT

A method for picking articles according to the goods-to-man principle at a picking station, in which articles are picked from product load carriers into order load carriers, the order load carriers are conveyed in a first row through the picking station, articles are presented in product load carriers and picking is carried out therefrom. The product load carriers are also conveyed in a second row through the picking station, the second row being arranged at an angle to the first row and picking taking place from a flow of product and order containers which are simultaneously conveyed through the picking station, to achieve a high throughput.

19 Claims, 11 Drawing Sheets

(51) Int. Cl.
    *B65G 43/10*      (2006.01)
    *B65G 47/90*      (2006.01)

(56)           References Cited

U.S. PATENT DOCUMENTS

| | | | |
|---|---|---|---|
| 2015/0104286 A1* | 4/2015 | Hansl | B65G 37/00 |
| | | | 414/800 |
| 2015/0114799 A1 | 4/2015 | Hansl et al. | |
| 2016/0355340 A1* | 12/2016 | Meurer | B65G 1/1378 |
| 2018/0009605 A1 | 1/2018 | Collin et al. | |
| 2020/0255223 A1* | 8/2020 | Collin | B65G 1/0485 |

FOREIGN PATENT DOCUMENTS

| | | | | |
|---|---|---|---|---|
| DE | 102018114026 A1 | | 12/2019 | |
| EP | 0092848 A2 | | 11/1983 | |
| EP | 1179491 A1 | | 2/2002 | |
| EP | 1886943 A1 | | 2/2008 | |
| EP | 2650237 A1 | * | 10/2013 | ........... B65G 1/1378 |
| EP | 2769936 A1 | | 8/2014 | |
| EP | 2826730 A1 | * | 1/2015 | ........... B65G 1/1373 |
| EP | 3337739 B1 | * | 2/2020 | ........... B65G 47/905 |
| JP | H0753017 A | | 2/1995 | |
| JP | 2005015102 A | | 1/2005 | |
| JP | 2007153490 A | | 6/2007 | |
| JP | 2010052878 A | | 3/2010 | |
| JP | 2017030974 A | | 2/2017 | |
| JP | 2017509560 A | | 4/2017 | |
| JP | 2017522247 A | | 8/2017 | |
| JP | 2018127344 A | | 8/2018 | |
| JP | 2019023145 A | | 2/2019 | |
| WO | 2012069327 A1 | | 5/2012 | |
| WO | WO-2013053747 A1 | * | 4/2013 | ........... B65G 1/1378 |
| WO | 2017027897 A1 | | 2/2017 | |
| WO | 2017110499 A1 | | 6/2017 | |
| WO | 2018006112 A1 | | 1/2018 | |
| WO | 2019008084 A1 | | 1/2019 | |
| WO | 2019008097 A1 | | 1/2019 | |
| WO | 2020066885 A1 | | 4/2020 | |
| WO | 2020113249 A1 | | 6/2020 | |

* cited by examiner

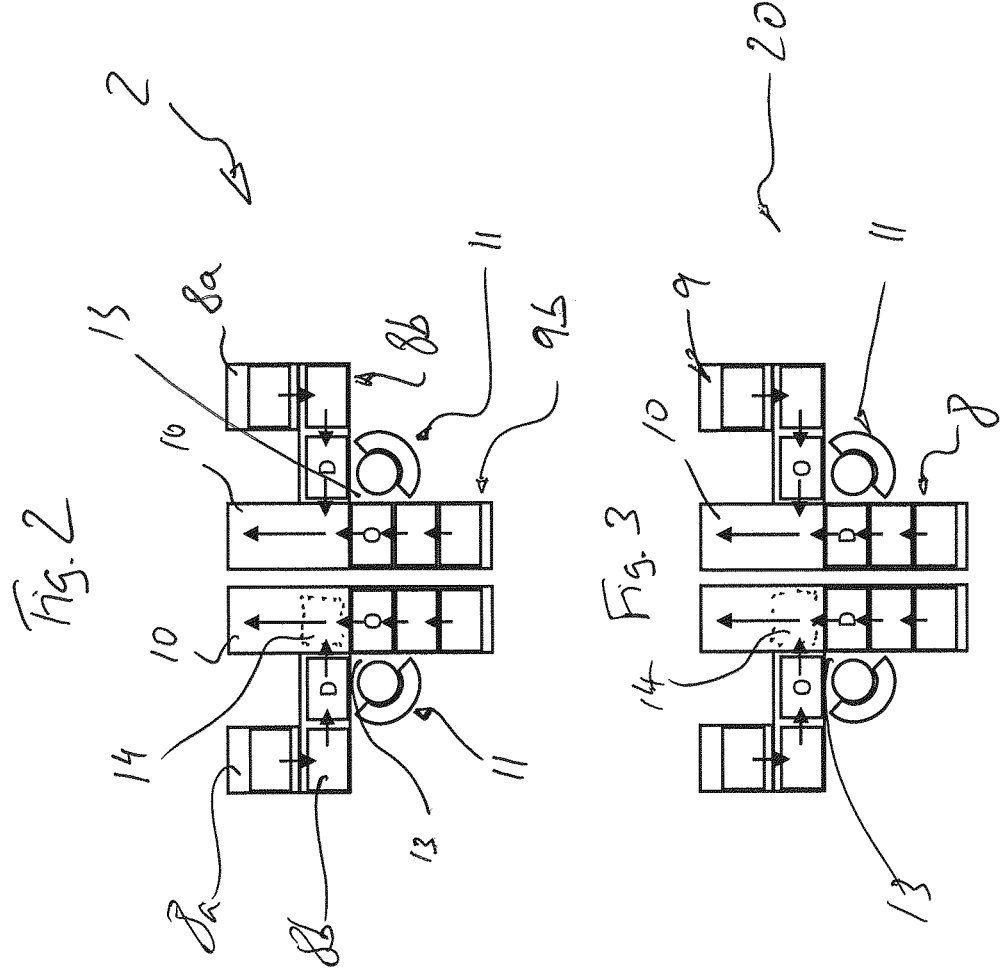

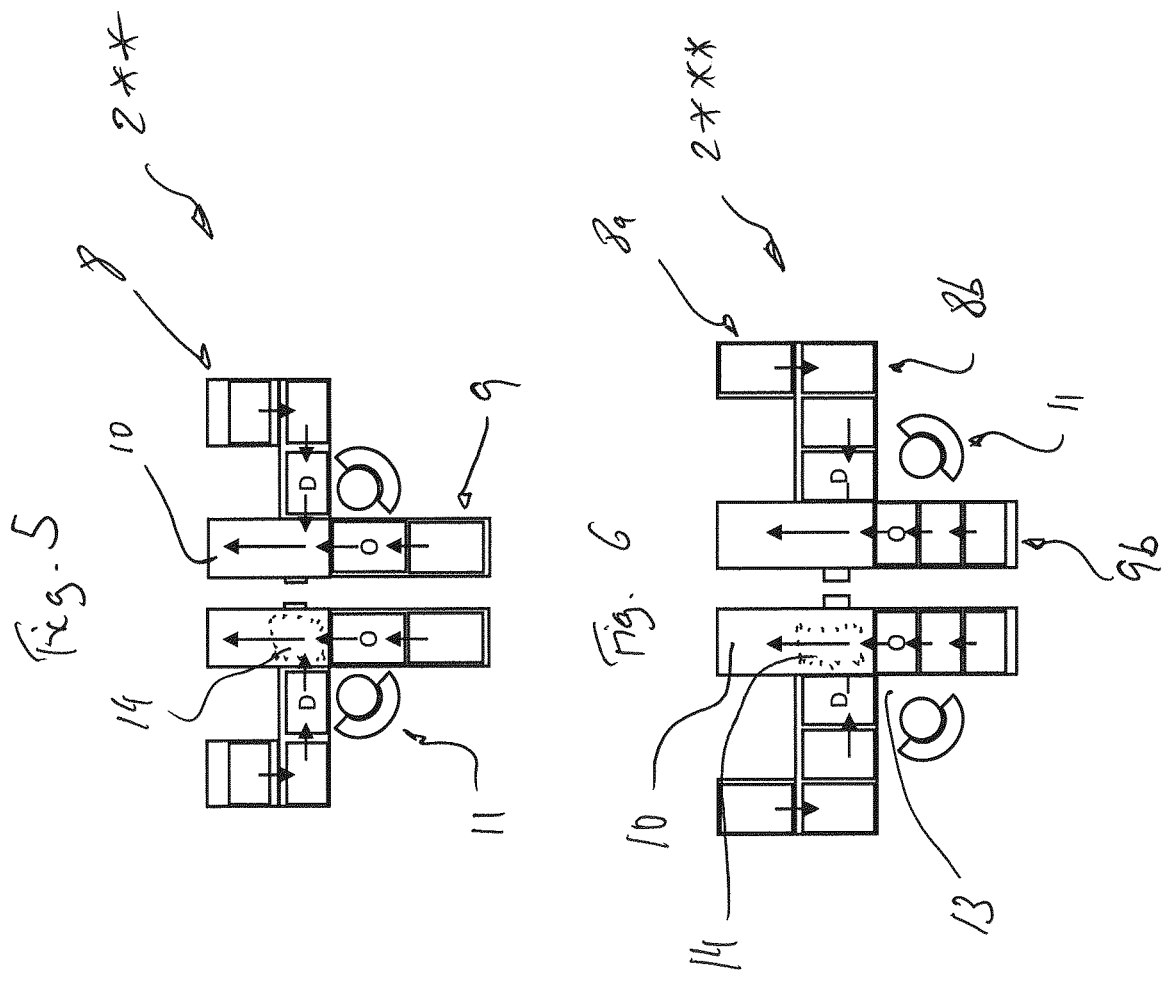

METHOD AND STATION FOR PICKING ARTICLES ACCORDING TO THE GOODS-TO-MAN PRINCIPLE

CROSS REFERENCE TO RELATED APPLICATION

The present application claims the priority benefits of International Patent Application No. PCT/EP2020/062887, filed May 8, 2020.

BACKGROUND AND FIELD OF THE INVENTION

The invention relates to a method for picking articles according to the goods-to-man principle at a picking station, in which articles are picked in an order load carrier, and to a corresponding picking station.

It is generally known to operate picking stations for picking according to the goods-to-man principle. In that case, the goods or articles of an order are transported to the respective picking station, for which purpose they are usually brought in inside containers, on trays etc. At that location, they are removed from the so-called storage or product containers and placed into the corresponding containers, trays, etc. of an order, so-called order containers.

This process is usually repeated until the respective order or partial order is completed using the zone picking process.

In order to increase throughput and/or reduce amount of product container movement, the worker often picks for a plurality of orders in parallel and so a plurality of order containers is kept in readiness in parallel in the picking station.

In case plurality of orders containers are presented, the picker can thus be shown by means of displays where the articles are to be placed. This is accordingly called "put-to-light". In addition, if/when a plurality of product containers is transported analogously to the picking station, a pick-to-light method can also be carried out and so the removal of articles is also simplified.

A put place is thus a place for order containers into which the goods/articles from the storage containers are correspondingly placed by the picker.

A put-to-light display is accordingly a display for the picker, in which order containers he is to place the article just removed from the product container, or a plurality of articles or the packing unit etc.

Conversely, the pick place is the place for a product container from which the picker removes the articles etc. A pick-to-light display is accordingly a display which displays to the picker the product container and/or possibly the articles and/or the quantity thereof for the picking step.

EP 2 769 936 A1 discloses a method involving providing an order container on loading point, into which various items are picked from storage tanks. The storage containers with items are sent automatically to a removal position, such that the items are removed from respective storage container and are transferred into order container. A first acknowledgment signal is generated after removal of items, such that the storage vessels are transferred in post-removal position and are transferred to removal position, while next storage container is kept in pre-removal position.

US 2015/0104286 A1 shows a method and a picking station for picking of articles from source loading aids by an order picker into destination loading aids, wherein the loading aids are conveyed via a first conveyor system to the picking station and at the picking station are provided for picking the articles and after a picking operation are discharged from the picking station again via a second conveyor system. A control device can co-ordinate the conveying movements of the source loading aids and destination loading aids in such a manner that the source loading aids and destination loading aids required for processing a picking order are brought together before the picking operation in the picking station onto a common picking conveyor of the first conveyor system passing through a working area or the order picker, and are presented to the order picker arranged next to one another as a picking group on the picking conveyor.

WO 2018/006112 A1 describes a method for the order-picking of articles at an order-picking station, in which method the source containers are conveyed in an arbitrary order towards a removal point and the destination containers are provided in a sorting buffer comprising buffer points in front of a single loading point. In order to process different order lines, once an article belonging to a first order line has been placed in a first destination container, said container is conveyed back to the sorting buffer and is temporarily buffered at a sorting point until a source container comprising an article belonging to a second order line is conveyed to a buffer track section provided upstream of the removal point. In order to process different order lines, once an article belonging to a second order line has been placed in a second destination container, said container is conveyed back to the sorting buffer, and is moved via a second sorting point to one of the buffer points, and then to the loading point, provided that a source container comprising an article belonging to a second order line has already been conveyed to the buffer track section. The invention also relates to an order-picking station.

US 2016/0355340 A1 discloses a method for picking items according to the goods-to-man principle and a picking station in which items are placed in order load carriers that are conveyed through the picking station in a row, and the put place of the order load carriers in the row changes when a chronologically preceding order load carrier is loaded and conveyed away. This disclosure also relates to a corresponding order picking station.

SUMMARY OF THE INVENTION

The present invention provides a simplified picking solution according to the goods-to-man principle, in which the structure of the picking stations is simplified and picking is made easier for the picker without reducing the throughput.

In accordance with an aspect of the invention, it has been recognized that if the product load carriers are also conveyed in a second row through the picking station, the second row being arranged at an angle to the first row and picking taking place from a flow of product and order containers which are simultaneously conveyed through the picking station, it is possible to increase picking performance with better ergonomics without expensive and complicated design or foregoing operational flexibility.

In other words, the operator (human or automatic robotic or human guided automated robot) performs the order fulfilment process of picking from the product load carrier "on the fly" and putting into the order load carrier while product load carriers are in movement. There is no stop halt or stillstand of the movement of the product and order load carriers on the respective conveying system, unless the operator falls behind e.g. he has not finished his work yet and/or he has not confirmed the pick and/or put is completed in time. The next product load carrier moves simultaneously following the current product load carrier. The order load carrier starts moving away from the operator following the product load carriers simultaneously as soon as the product load carrier is conveyed away (e.g. along the take away conveyor) provided that the put operation is completed. Unfilled order load carriers located upstream of the completed order load carrier(s) being taken away follow the completed order load carriers simultaneously.

Additionally, both load carriers may be moved simultaneously (at the same time) and continuously (always). It is also possible to convey the load carriers with same or differing speeds.

Accordingly, the order load carriers and product load carriers may be conveyed through the picking station at different and/or varying speeds, meaning for example that the product load carriers may be moved through the picking station with a higher speed than the load carriers. It is also possible to vary the speed, e.g. start moving product container quickly with higher acceleration and speed enabling the container to arrive within operator's reach quickly and once it is within his reach, start decelerating slowly allowing the operator to pick the products on the fly possibly depending on the kind of order being picked. Orders having one or two articles may be picked using a single or two product load carriers, which could then be moved swiftly as they only need a short picking time or duration in the station as the product load carriers would be controlled to be available at the same time or shortly after each other and in turn order load carriers can then also be moved swiftly.

The exchange and discharge of load carriers may be optimized if the order load carriers and product load carriers share a common take away after picking. Then the common take away should be inline with the first row of the order load carriers or the second row of the product load carriers. In other words, it forms a linear extension of the respective conveying system along its longitudinal axis.

To optimize article presentation in the load carriers to the operator, it is possible to vary the orientation of the load carriers on the conveying system. In other words, the order load carriers and/or the product load carriers are conveyed through the picking station in a narrow side leading orientation and/or a wide side leading orientation. For example, the operator may face load carriers in the donor (picking) position in wide side leading orientation and at the put or order position in narrow side leading orientation; or the operator may face load carriers in the donor (picking) position in narrow side leading orientation and at the put or order position in wide side leading orientation; or the operator may face load carriers in the donor (picking) position in wide side leading orientation and at the put or order position in wide side leading orientation; or the operator may face load carriers in the donor (picking) position in narrow side leading orientation and at the put or order position in narrow side leading orientation.

While performing order fulfilment it is often necessary to consolidate partial orders that have been picked at different times and/or locations temporarily buffered in more than one order load carrier. Likewise, it is often necessary to consolidate product load carriers by combining two or more depleted product load carriers. In accordance with the invention it is therefore possible that partial picking may be consolidated by picking from product load carriers and putting to product load carriers and/or by picking from order load carriers and putting to order load carriers for consolidation of load carriers.

If the order load carriers and product load carriers are conveyed through the picking station at different and/or varying speeds, it becomes possible to reroute order load carriers through the product load carrier conveying system to the put position. This may be necessary to perform "top up" operation of order containers picked elsewhere with the product to be picked within the current pick station.

If a product load carrier contains articles that will be needed in the near future for further orders it is possible to buffer the corresponding load carrier at the picking station and to discharge it right away. In other words, after removal of the desired articles for picking an order, used product load carriers may be transported away out of the pick place into a temporary buffer position for later use in a further picking operation.

Likewise, it may be that a certain order cannot be fulfilled or finished right away but that it is known in the management software or system to the controller that it can be finalized in the near future. Then after placement of desired articles for partial order picking, order load carrier may be transported away out of the pick place into a re-use buffer position from which it may be returned to the order carrier row for later completion of the order picking.

The invention also pertains to a picking station for picking articles according to the goods-to-man principle, wherein articles are picked in order load carriers, wherein the articles in product load carriers are conveyed through the picking station on a first linear conveying system and the order load carriers are conveyed through the picking station on a second linear conveying system, wherein the first and second conveying system are arranged at an intersecting angle to each other and are controlled by a controller to provide a continuous conveyance flow of product and order containers through the picking station.

Load carriers may share a discharging and gathering third conveying system, which is either inline with the first or second conveying system, which said third conveying system may optionally include a downstream divert. The divert may be used to route discharged order load carriers differently than product load carriers.

Each conveying system may be formed as an individually controllable and operable conveyor. This for example allows for individual control of speed.

When the put place/picking position is formed at the angle between the linear first and second conveying systems or at the intersection with the third conveying system, it is easily accessed and allows the operator at the same time to also ergonomically access both the historically oldest product load carrier and historically oldest order load carrier at the same time without need to move his body. Therefore, the success rate is high.

To allow for temporary storage for re-use of product load carriers or finalization of order load carriers, a buffer position may be arranged besides the first and/or second linear conveying system. This allows intermediate parking or shuffling of load carriers.

To achieve better view into and pick from and put to load carriers, i.e. to improve ergonomics, the first and/or second linear conveying system may have a tilting mechanism for tilting the load carriers towards an operator. The tilting mechanism may be an active or passive mechanism or even a stationary tilt of the corresponding conveying system. Tilting of the donor (product) position may be done by means of tilting the respective conveyor itself allowing a product load carrier to be tilted when it is transferred from one conveyor to another. Tilting of an order position may be done by means of active tilting mechanism e.g. tilted RAT (Right Angle Transfer) and only a corresponding put position may be tilted (adaptive tilting) providing operator a distinct indication where the picked items are to be put to.

According to an aspect of the invention, it has been realized that pick performance and ergonomics, which also strongly influence pick rate, are major success factors of a goods-to-person picking station. Especially exchange time of donor (or product) and order carriers followed by ergonomics (including operator moving distance and angles) influence an achievable pick rate. The most effective way to minimize the exchange and pick time is to provide an operator the following features, 1. Donor look on the fly and even look ahead (operator to recognize what to pick ahead of time);

2. Pick on the fly and even pick ahead (pick operation during donor movement);

3. Put on the fly and even put ahead (put operation during order movement);

4. Minimize operator movement

To accomplish this a conveyor-based pick and put position moving consecutive donors and orders horizontally towards the operator and away from operator once pick/put operation is completed and locate those positions as close to the operator as possible is provided by the invention.

To provide an ergonomic working environment each conveyor needs a certain spacing to realize such features and/or to not decrease pick rate due to extra moving distance of operator, the common take away allows to realize both high speed donor and order exchange in the manner described above without worsening operator ergonomics and pick performance. Additionally, it is possible to combine batch pick/put capability.

The articles can either be conveyed directly as such when this is permitted by the article properties, or can be present in the product load carrier and be picked therefrom. The load carriers can be containers, trays, boxes etc. as known in the prior art. The load carriers are preferably conveyed in a first-in-first-out (FIFO) row through the picking station.

Aspects of the invention can also include the following features (i) in that the order load carriers and product load carriers are conveyed through the picking station at different and/or varying speeds; (ii) in that each conveying system is formed as an individually controllable and operable conveyor; (iii) in that the put place/picking position is formed at the angle between the linear first and second conveying systems or at the intersection with the third conveying system; (iv) in that a buffer position is arranged besides the first and/or second linear conveying system; and (v) in that the picking and putting operation is performed by a robotic picker.

According to aspects of the invention, the operator may command discharge of the product load carrier from the pick position directly after picking before or during putting into an order load carrier in parallel to his put operation. To do so, the operator may press a completion button after pick (i.e. taking an article from a product container) and before completion of the put process (putting the picked article into an order container). He may press the button during his put process or even prior to his put process after picking is completed. Such buttons would ideally be located in a manner that the operator can efficiently activate them without requiring an extra steps/motion.

Therefore, in order to smoothen the pick and put process and making best use of pick and put on the fly/ahead feature for the sake of improving pick performance, the operator buttons to be pressed by operator generally on the completion of each pick and put operation are ideally located in such a manner that operator can efficiently press them irrespective of his picking style during the put process or even prior to the put process when it makes sense. The operator may do so in parallel to his put operation so dedicated step and time spent to press such buttons can be eliminated when it happens.

The picking station may include temporary shelving in a raised position above the working area where the operator may place picked article(s) for near future order fulfillment operation to buffer these for the future use without need for re-routing from and back to the picking station. In doing so the operator may be guided by, but not limited to, pick by light, voice, or screen (or combinations thereof) which shelf location to use and quantity of product article to be put therein. Such temporary shelving can be used primarily as a temporary product buffer so only single article types per location will be buffered. The operator is then instructed to pick from those location(s) to fulfill relevant orders that requires buffered article. Alternatively, it may also be operated as a temporary order location where different articles may be placed according to an order list. Those articles would then all be placed/put to a specific order load carrier at the same time, to achieve a fully consolidated or almost consolidated order.

In other words, the invention can be characterized as realizing high speed exchange of both donors and orders by means of simultaneous movement of consecutive donors and orders into common take away combined with/without optimized order sequencing batch picking function.

The invention is especially useful for storages having storage spaces for load carriers double deep or multiple deep and optionally having transverse conveyance locations for exchange purposes. For this purpose, the load picking-up means of the storage apparatuses (ASRS), e.g. telescopic rail arms, can have an extended reach.

It is particularly preferred if the storage apparatuses are racking serving units or single-level racking serving units. Shuttles or satellite vehicles are particularly suitable. It is also possible to use shuttles which have a lifting platform or a plurality of load picking-up means platforms, which are arranged one above the other, for serving a plurality of levels from one travel rail.

Therefore, in accordance with the invention it is possible to achieve a particularly high level of removal-from-storage efficiency while completely maintaining the desired sequence of the transport units in each aisle.

Further features and details of the invention are apparent from the description hereinafter in connection with the drawings.

BRIEF DESCRIPTION OF THE DRAWINGS

FIG. 2 shows a schematic plan view of a picking station according to the invention;

FIG. 3 shows a schematic plan view of a further picking station according to the invention;

FIG. 5 shows a schematic plan view of a further picking station according to the invention;

FIG. 6 shows a schematic plan view of a further picking station according to the invention;

DESCRIPTION OF THE PREFERRED EMBODIMENTS

Figure 1:
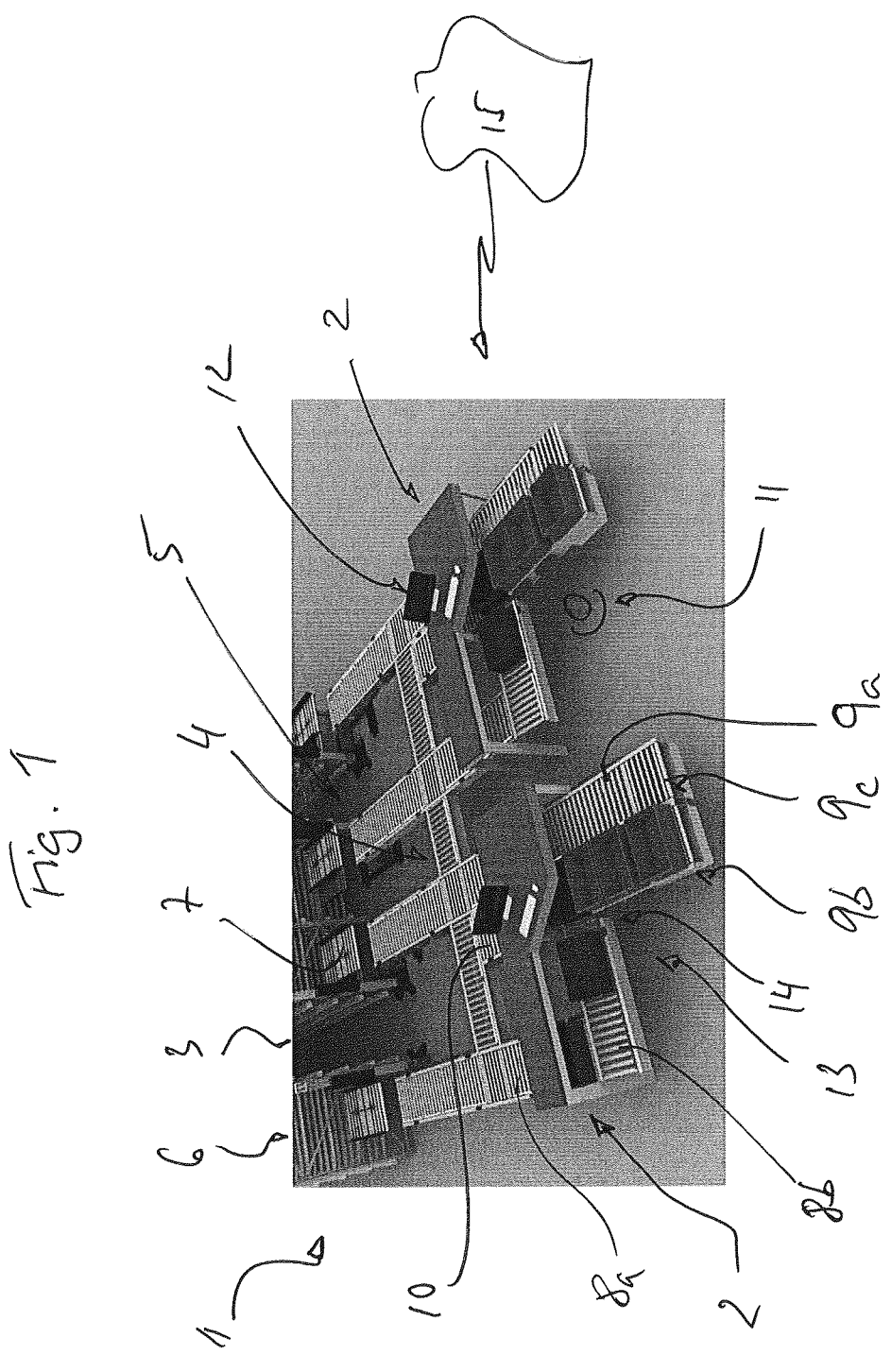
FIG. 1 shows a schematic perspective view of a picking area with two picking stations according to the invention.

In FIG. 1 a schematic perspective view of a picking area 1 with two picking stations 2 that are connected to a racking 3 by conveyors 4 is shown. Each picking station 2 corresponds to an aisle 5 of the racking 3 with the racks 6 neighboring the aisle 5 in between and is connected to a retrieval machine 7 (e.g. a lift or elevator) arranged within the footprint of each rack 6 at its front end via the conveyors 4. The racks are serviced by ASRS machines not shown, e.g. shuttles, that drop off loads to the vertical conveyors same as above 7. The conveyors 4 bridge the racking 3 and the picking stations 2, connecting to an inbound product load carrier conveyor 8a, b and an inbound order load carrier conveyor 9a, b and a common take away discharge conveyor 10. The load carriers themselves can for example be standard containers or trays.

Inbound product load carrier conveyor 8 has a first conveying section 8a leading into the station in extension of the aisle direction and a second conveying section 8b oriented 90 degrees thereto forming the actual conveying system within the station for presentation of the load carriers with products to pick from to the operator 11. Inbound order load carrier conveyor 9 has a first inbound conveying section 9a leading into the station in extension of the aisle direction and a second conveying section 9b which is arranged in parallel thereto connected by a right-angle-transfer (RAT) 9c.

Product load carrier conveyor section 8b and load carrier conveyor section 9b intersect each other on the forming an operating position 13 for the operator and intersection 14. The intersection can be formed in a wide range of angles, but usually will be in the range between 60 and 120 degrees, preferably 90 degrees. Common take away discharge conveyor 10 is arranged in direct extension of order load carrier conveyor section 9b and starts at the intersection 14 with product load carrier conveyor section 8b.

Each pick station 2 may include a display and controls 12 for information of and control by the operator 11. The operator may also be guided by other means, like pick by light, pick-by-voice and virtual reality etc. The picking station may also not have any such means and picking may be performed based on "paper".

Figure 16:
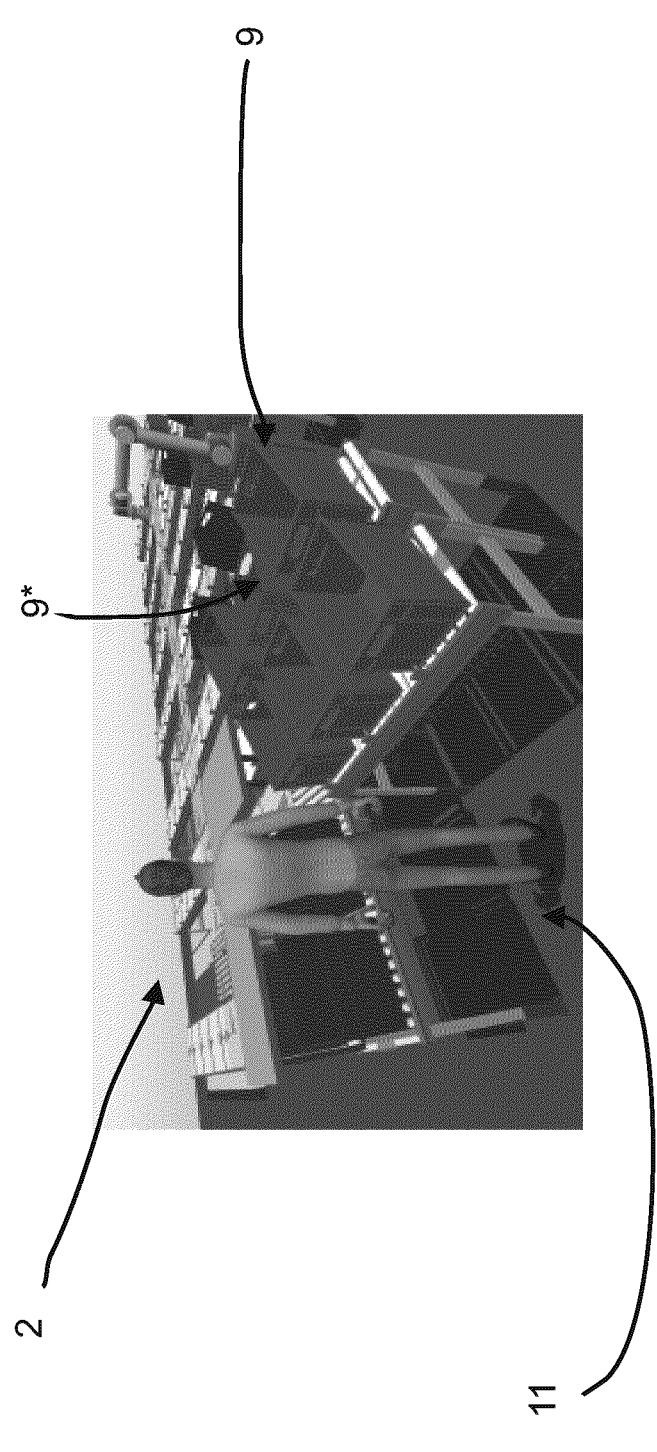
FIG. 16 shows a schematic perspective view of a further picking station according to the invention.
Figure 17:
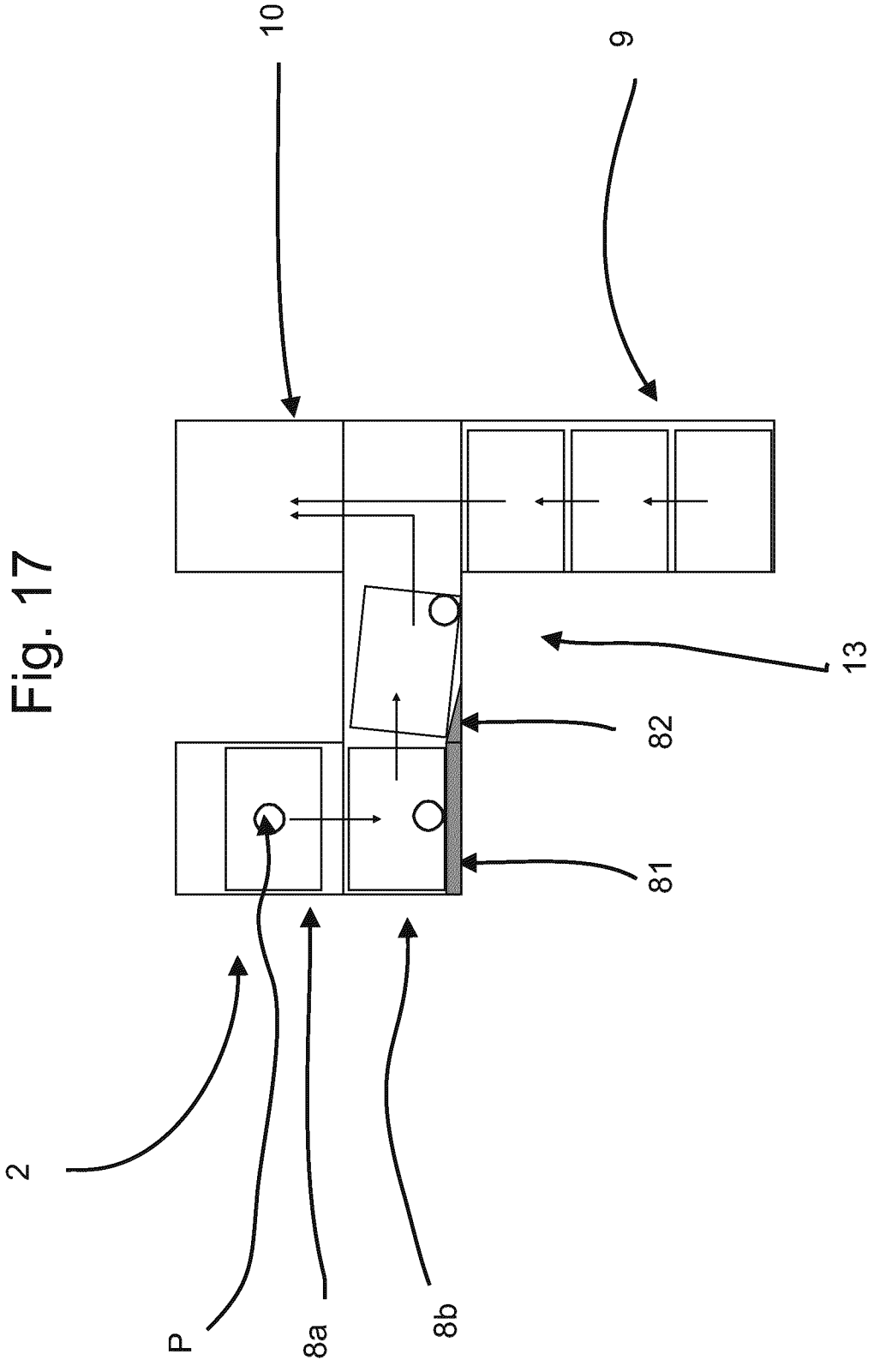
FIG. 17 shows a schematic perspective view of a further picking station according to the invention and FIG. 18 shows a schematic plan view of a further picking station according to the invention with completion buttons and temporary shelving located according to the invention.

Product load carrier conveyor section 8b as a whole may be tilted towards the operating position 13. Another optimization in relation to presentation may be to tilt pick and/or put position. Tilting of the donor position is done by means of tilting conveyor 8b itself allowing the product load carrier to be tilted when it is transferred from 8a to 8b. Tilting of order positions can be done by means of active tilting mechanism e.g. tilted RAT (Right Angle Transfer) and only the corresponding put position can be tilted (adaptive tilting) providing operator a distinct indication where the picked items are put to (see FIG. 16). RAT positions of conveyor 9 can be adaptively tilted. In the FIG. 16 position 9* is e.g. not tilted and the other positions are tilted.

To dampen the "fall" of the load carriers being pushed over the edge from conveyor section 8a to tilted conveyor section 8b, a bumper 81 made out of rubber or other soft material to soften the impact when the load carrier is pushed onto the tilted conveyor section 8b, is positioned on the first edge of the conveyor section 8b opposite the conveyor section 8a. Therefore, product P is moved within the load carrier to the lower edge of the tilted load carrier, as indicated. The load carrier D is then transported on the tilted conveyor section 8b along the bumper 81 that has progressively narrower end 82 until it ends altogether. So the load carrier is additionally tilted in a second dimension (skewed) as it travels and together with a controlled deceleration of conveyor section 8b, this flushes the products P toward the right bottom corner, as indicated. This reduces the settling time of product and easier picking as the most obvious position is known before hand and the product is positioned closest to operator/robot.

The conveyor positions on conveyor section 9a behind put positions on conveyor 9b may be used as additional put positions (see e.g. FIG. 16), especially for robotic station 20R (longer arm reach).

The conveyors are controlled by controller 15 to provide a simultaneous and continuous conveyance flow of product and order carriers through the picking station 2 on the respective conveyors 8, 9 and 10 in accordance with the needs for order fulfilment, which in turn is managed by an overall warehouse management system (WMS) interacting and interfaced with an order tracking system. Obviously also the controller is used to control overall material flow within the racking 3 and 5 and from there to the picking stations 2 and 3.

In the following schematic FIGS. 2-18 variations in design and operation of analogous picking stations 2 are described. Order load carriers are designated with O and product load carriers (donors) with D. Otherwise the reference numerals introduced above will be used to refer to like parts.

In FIGS. 2 to 6 the variations shown deal with the switch of the arrangement of product load carrier conveyor 8 and order load carrier conveyor 9 as well as the change of conveying orientation of the load carriers between narrow side leading and wide side leading in the direction of movement on the respective conveyor section 8b, 9b.

In FIG. 2 the product load carriers D are conveyed on section 8b with the narrow side leading and the order load carriers O are conveyed on section 9b with the wide side leading. Product load carrier conveyor 8 and order load carrier conveyor 9 are arranged as described with respect to FIG. 1.

In FIG. 3, the arrangement of product load carrier conveyor 8 and order load carrier conveyor 9 are essentially exchanged, switching positions, so that the order load carriers O are conveyed on section 9b with the narrow side leading and the product load carriers D are conveyed on section 8*b* with the wide side leading.

Figure 4:
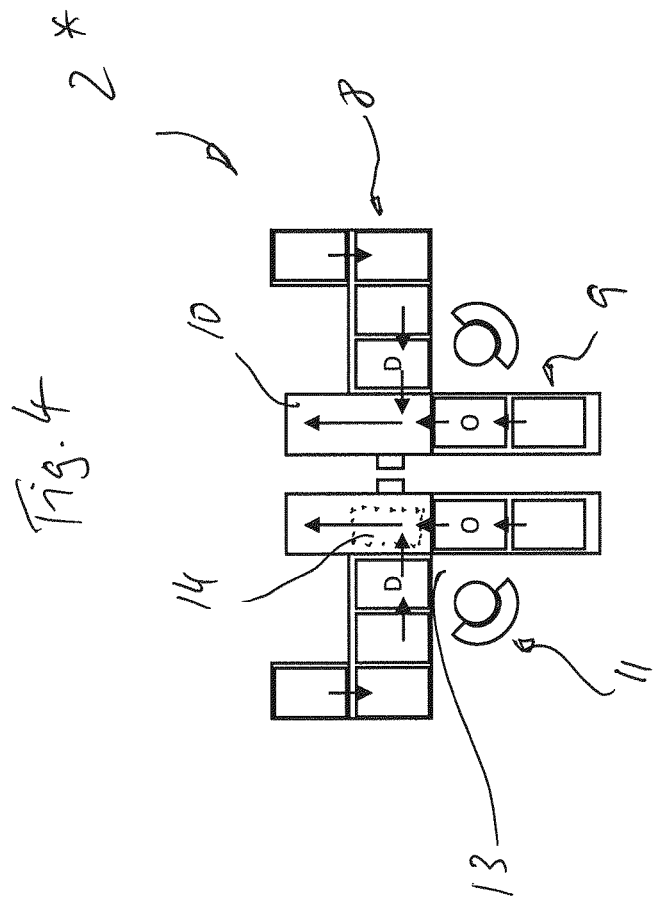
FIG. 4 shows a schematic plan view of a further picking station according to the invention.

In FIG. 4 the product load carrier conveyor 8 and order load carrier conveyor 9 are arranged same as in FIGS. 1 and 2, but the conveying orientation of the load carriers between narrow side leading and wide side leading in the direction of movement on the respective conveyor section 8*b*, 9*b* has been flipped so that now the order load carriers O are conveyed on section 9*b* with the narrow side leading and the product load carriers D are conveyed on section 8*b* with the wide side leading.

In FIG. 5, product load carrier conveyor 8 and order load carrier conveyor 9 are arranged again same as in FIGS. 1 and 2, but now the order load carriers O are conveyed on section 9*b* with the narrow side leading.

In FIG. 6 the arrangement is same as in FIG. 4 but now the order load carriers O are conveyed on section 8*b* with the wide side leading.

Figure 7:
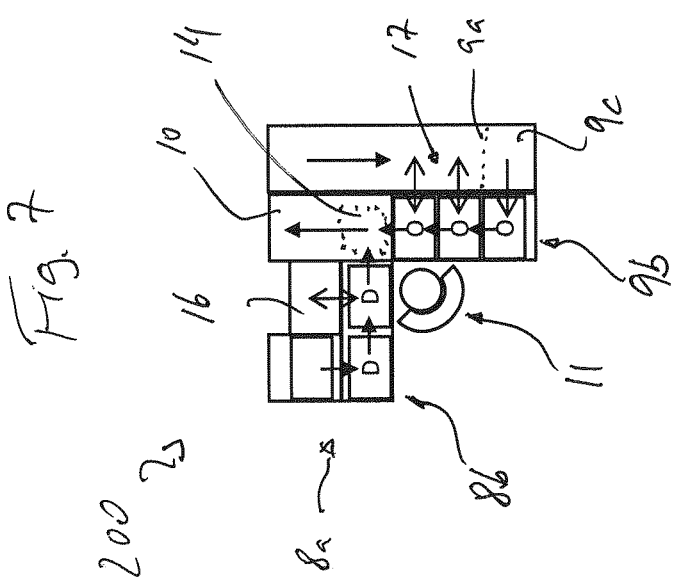
FIG. 7 shows a schematic plan view of a further picking station according to the invention.

In FIG. 7, the use of temporary parking or buffer positions 16 for the product load carriers D and the use of parking/shuffling 17 order load carriers by using inbound conveyor section 9*a* in parallel to section 9*b* is detailed. Temporary parking or buffer position 16 is arranged behind the conveyor section 8*b* before the intersection 14, so that the article in product load carrier may be reused for a further pick later in time by temporarily placing the respective product load carrier in the buffer position 16 and retrieving it in time, as indicated by the controls and display. The conveyor section 8*b* would then be controlled to slow down speed and/or put the following product container on hold and leave an empty window to make space for the load carrier retrieved from position 16. By parallel arrangement of inbound order load carrier conveyor section 9*a* and 9*b*, it becomes possible to push off an order load carrier O as indicated before it reaches the common take away 10. This allows change of sequence, and also to reuse the corresponding order load carrier at a later point in time with it having to leave the picking station 200, but essentially being routed in a virtual loop, e.g. to gain necessary time for a respective product load carrier P to reach the station. The corresponding picking stations 200 may have both buffer position 16 and shuffling function 17 or only one of them.

Figure 8:
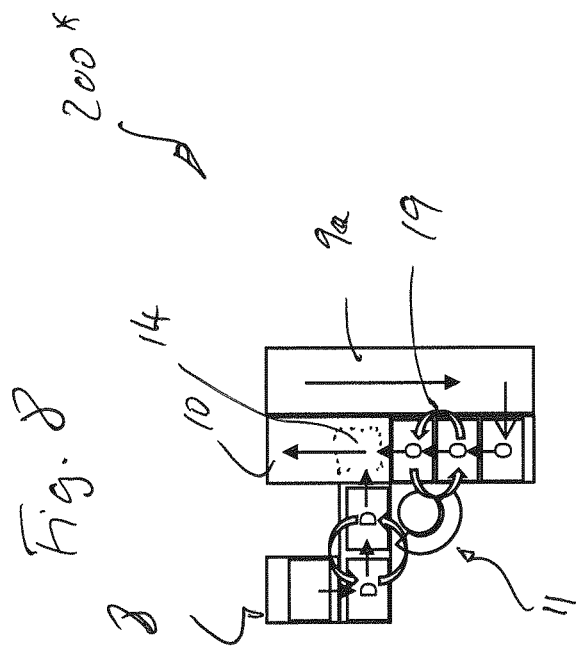
FIG. 8 shows a schematic plan view of a further picking station according to the invention.

In FIG. 8 the same station 200 is shown to demonstrate the possibility of picking from and to product load carriers D and/or order load carriers O. This allows for product consolidation to be performed by picking from product load carriers D and putting to product load carriers D as indicated by arrow 18 and by picking from order load carriers O and putting to order load carriers O as indicated by arrow 19 (e.g. for consolidation of load carriers). This allows for order consolidating partially picked order load carriers and also for uniting/consolidating product load carriers becoming empty.

Figure 9:
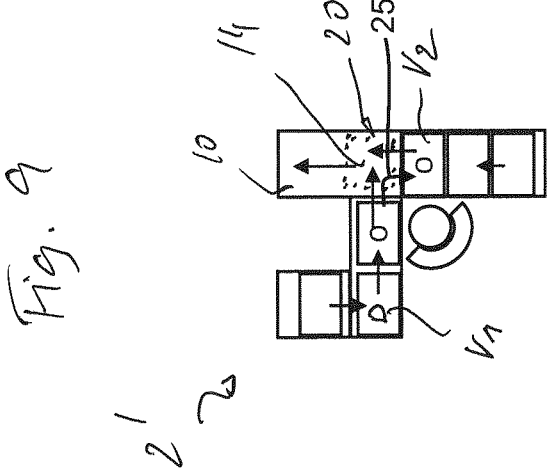
FIG. 9 shows a schematic plan view of a further picking station according to the invention.

In FIG. 9, the picking station of FIG. 2 is shown in a situation where the order load carriers and product load carriers are conveyed through the picking station at different and varying speeds V1, V2. Therefore, it becomes possible to reroute order load carriers O through the product load carrier conveying system 8 to the intersection 14 being the put position 20 or even move backwards (opposite to normal flow direction) on conveyor section 9*b* if speed V2 is then negative for that movement (see arrow 25). This may be necessary to perform "top up" operation of order containers picked elsewhere with the product to be picked in the current picking station. Speed V2 of conveyor system 9 is then extremely slowed down and speed V1 of conveyor system 8 accelerated such that without completely stopping the described rerouting becomes possible in extreme situations.

Figure 10:
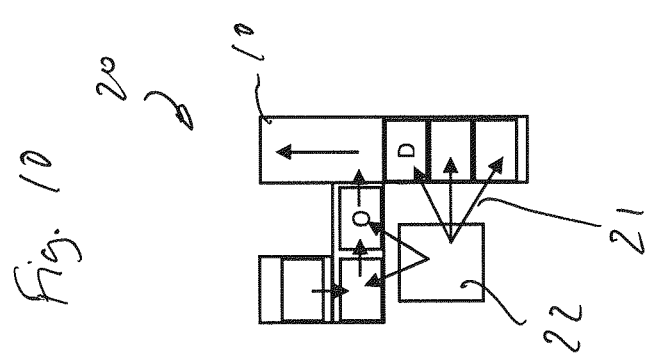
FIG. 10 shows a schematic plan view of a further picking station according to the invention.

In FIG. 10 the picking station 20 of FIG. 3 is shown during a replenishment on the fly process in which the operator (not shown) replenishes 21 product load carriers D during normal picking operations e.g. from a pallet 22 or other supply form, provided in the area of the operation position 13. At the same time or alternatively, the operator can then also use the articles from the pallet 22 to perform direct pick and put to the order load carriers O. This can be beneficial if such articles are large or delicate etc. and as such may not be handled automatically in the racking system.

Figure 11:
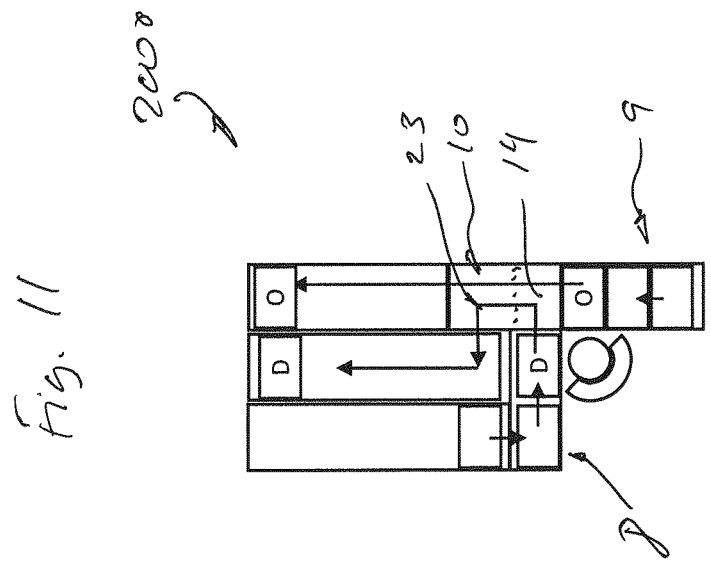
FIG. 11 shows a schematic plan view of a further picking station according to the invention.

The picking station 2000 shown in FIG. 11 differs from those above in that the common take away discharge conveyor 10 includes a divert 23 downstream from the intersection 14, so that order load carriers O and product load carriers P may be routed differently, e.g. this allows product load carriers P to be returned to racking 3 while finished order load carriers O may be sent to shipping.

Figures 12, 13:
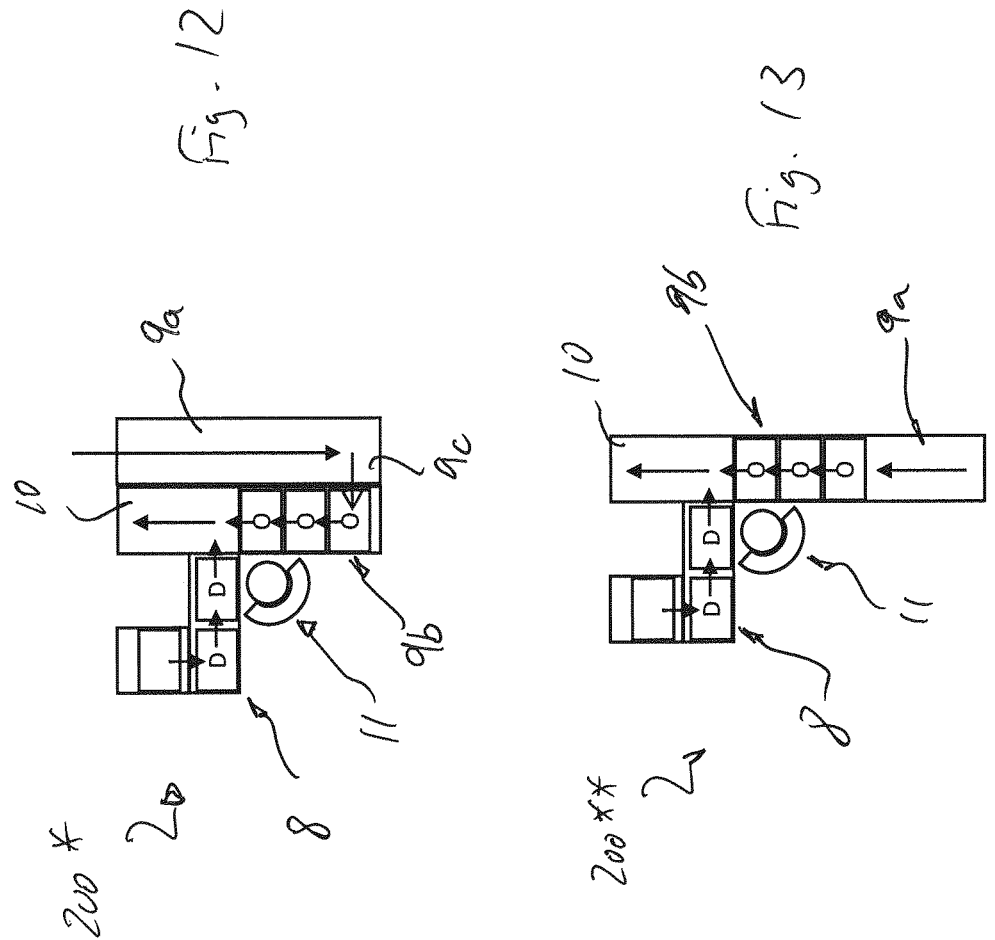
FIG. 12 shows a schematic plan view of a further picking station according to the invention.
FIG. 13 shows a schematic plan view of a further picking station according to the invention.

The picking stations 200* and 200 of FIGS. 12 and 13 indicate the different possibilities of arranging inbound conveying section 9***a* as either parallel to conveying section 9*b* (FIG. 12) or inline/extension thereof (FIG. 13), both on the same operating plane.

Figure 14:
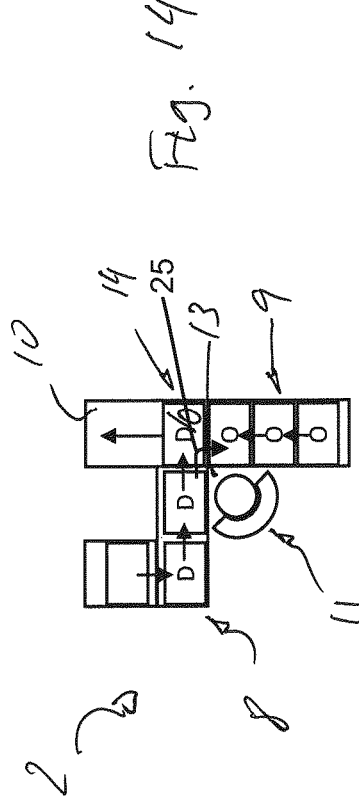
FIG. 14 shows a schematic plan view of a further picking station according to the invention.
Figure 15:
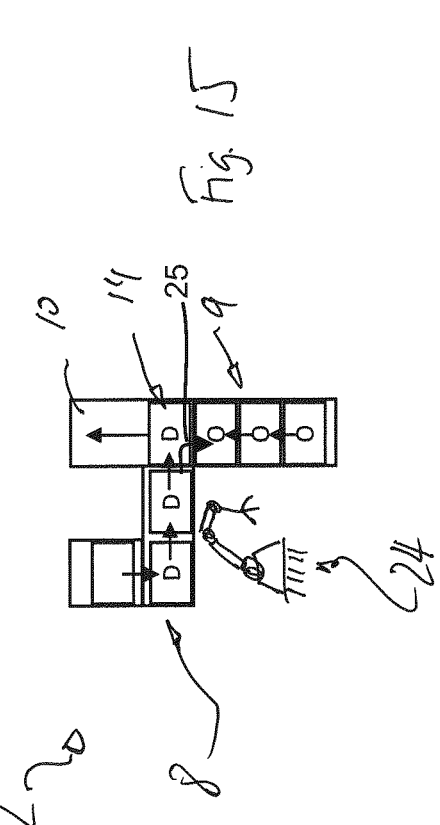
FIG. 15 shows a schematic plan view of a further picking station according to the invention.

FIGS. 14 and 15 indicate that the intersection 14 may be used as pick or put position and a load carrier on intersection 14 may even move backwards (opposite to normal flow direction) on conveyor section 9*b* and that the operator may be a robotic unit 24, that can be autonomous by using vision systems or human guided but automated etc.

Figure 18:
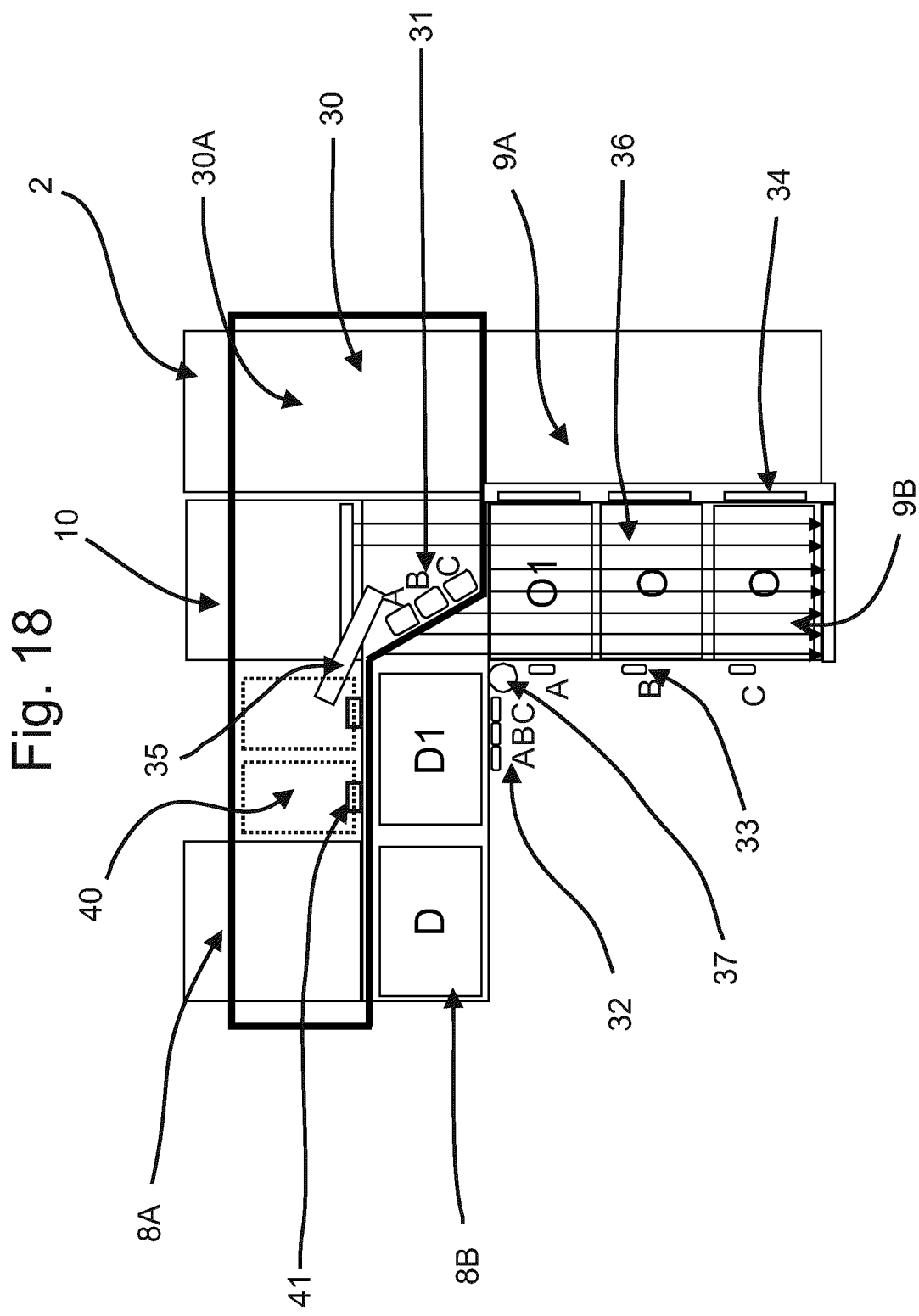

FIG. 18 details a picking station 2 according to the invention in which details concerning the operator interface 30 for order fulfilment are shown, which includes a raised desk-like surface 30A with colored (blue, yellow, red) illuminated buttons 31 facing the operator and indicating the corresponding put positions of the order load carriers O. The displays 31 are illuminated and may indicate the quantity of articles to be picked from the closest product load carrier D1. Additionally, article and its quantity may be shown on a screen 35, which would be located nearby D1 and illuminated button 31 and giving the operator more information, e.g. showing the article/product in detail, which could be helpful especially if the product load carriers contain mixed articles. There may also be put LED's 34 located behind each put position just above the put level indicating the corresponding put positions of the order load carriers O and quantity of articles to be put in each location.

In addition to the illuminated buttons 31, there are three (corresponding to number of put locations) illuminated buttons 32, 33 representing each put position in different locations for easy access and indication of the operator irrespective of his picking style (e.g. left or right single handed, pick with left hand and put with right hand) that again may indicate the quantity of products to be placed into the corresponding order load carrier O (put process). Alternatively, or additionally, there may be an illuminated button 37 to be pressed by the operator for completion of work independent of put location or completion of all works. Additionally, a light barrier 36 may be attached underneath the raised desk 30A for monitoring presence of an operator arm(s) and/or order load carrier overhang (inaccurate positioning). The light barrier 36 may also be used to initiate discharge of the product load carrier D1 from the pick position by blocking the barrier and/or discharge of order load carrier O1 from the put position by unblocking the barrier. Buttons 32 are arranged as a group parallel to conveyor section 8*b* of the product load carriers at the operating position 13. Buttons 33 are arranged parallel to conveyor section 9*b*, in front of each order load carrier position. Button 37 is typically placed at the intersected location of 8B and 9B.

The operator may command discharge of the product load carrier D1 from the pick position directly after picking, before or during putting the article into an order load carrier O in parallel to his put operation. If the corresponding article(s) is/are to be put to 1st put position, button 31A (blue illuminated) and put LED 34 are activated. If it is single pick order (one article per order), donor product load carrier D1 may be exchanged once light barrier is blocked. If the order contains several different articles, i.e. multiple picks, donor product load carrier D1 will not be exchanged unless blue button 31 or 32A or 33A or 37 is pressed. Thereafter, order load carrier O1 is taken away (via common take away 10) if it has received its last pick (article in the order). The other following order load carriers are then indexed forward. However, this will not happen, unless the light barrier is unblocked.

Correspondingly, if article(s) is/are to be put to 2nd put position, yellow illuminated button & put LED 34, 31, 32B, 33B or 37 is activated or if article(s) are to be put to 3rd put position, red illuminated button & put LED 34, 31, 32C, 33C or 37 is activated. If article(s) must be put to multiple positions, the relevant illuminated buttons & put LED's are activated in parallel.

The quantity for each put position may be displayed on 31, 32, 33, 34, and/or shown on screen and put LED 34 at same time. The donor product load carrier D1 is indexed away once all corresponding buttons have been pressed. The buttons can be pressed during put process or even prior to put process meaning that after pick but before put operation.

The picking station 2 may include temporary shelving 40 in a raised position near the screen 35 where the operator may place picked article(s) for near future order fulfillment operation to buffer these for the future use without need for re-routing from and back to the picking station. The operator is guided by, but not limited to, pick by light 41, voice, or screen 35 (or combinations thereof) which shelf location 40 to use and quantity of product article to be put therein. If an order requires the corresponding article, the operator is instructed to pick from the respective shelf 40 guided by an aforementioned device from which shelf location to pick and which quantity of article to take. This temporary shelving 40 is primarily used as a temporary product buffer so only single article types per location will be buffered.

Alternatively, it may also be operated as a temporary order location where different articles may be placed according to an order list. Those articles would then all be placed/put to a specific order load carrier O at the same time, to achieve a fully consolidated or almost consolidated order.

The invention claimed is:

1. A method for picking articles according to the goods-to-man principle at a picking station, said method comprising:
  conveying order load carriers in a first row through the picking station;
  conveying product load carriers in a second row through the picking station, wherein the second row is arranged at an angle to the first row; and
  picking from a flow of the product load carriers and the order load carriers which are simultaneously conveyed through the picking station, wherein articles are presented in the product load carriers and picking is carried out therefrom, and wherein the order load carriers and the product load carriers share a common take away after picking.

2. The method as claimed in claim 1, wherein the common take away is in-line with the first row of the order load carriers or the second row of the product load carriers.

3. The method as claimed in claim 1, wherein the order load carriers and/or the product load carriers are conveyed through the picking station in a narrow side leading orientation or a wide side leading orientation.

4. The method as claimed in claim 1, wherein multiple pick and/or put positions are presented in the picking station.

5. The method as claimed in claim 1, further comprising instructing the picker to put to a second order load carrier position to allow the order load carriers and/or the product load carriers to be conveyed through the picking station simultaneously.

6. The method as claimed in claim 1, further comprising picking from selected ones of the product load carriers and putting to other ones of the product load carriers for consolidation of the product load carriers and/or picking from selected ones of the order load carriers and putting to other ones of the order load carriers for consolidation of the load carriers.

7. The method as claimed in claim 1, further comprising transporting, after removal of desired articles for a picking order, used product load carriers away out of a pick place into a temporary buffer position for later use in a further picking operation.

8. The method as claimed in claim 1, further comprising transporting, after placement of desired articles for partial fulfillment of an order picking, an order load carrier away out of a pick place in the first row into a re-use buffer and/or shuffle position from which it may be returned to the first row for later completion of the order picking.

9. The method as claimed in claim 1, wherein the picking station is configured to allow an operator to either look on the fly or look ahead concerning selected ones of the product load carriers to recognize and prepare what to pick ahead of time;
  wherein if on the fly the operator then picks on the fly during the product load carrier movement and then puts on the fly during the order load carrier movement with or without varying the conveyance speed of those selected product load carriers; and
  wherein if ahead the operator then picks ahead during the product load carrier movement and then puts ahead during the order load carrier movement with or without varying the conveyance speed of those selected product load carriers.

10. The method as claimed in claim 1, further comprising providing a discharge command by an operator discharging a product load carrier from a pick position directly after picking and either before or during putting into an order load carrier in parallel to a put operation.

11. The method as claimed in claim 1, further comprising routing the order load carriers via a product load carrier conveyor to an intersection of an order load carrier conveyor and a product load carrier conveyor comprising a put position.

12. The method as claimed in claim 11, wherein said routing order load carriers via the product load carrier conveyor to the intersection of the order load carrier conveyor and the product load conveyor further comprises routing a selected one of the order load carriers backwards on the order load carrier conveyor.

13. A picking station for picking articles according to the goods-to-man principle comprising:

a picking station;

a first linear conveying system, wherein the first linear conveying system is configured to convey articles in product load carriers through the picking station; and a second linear conveying system, wherein the second linear conveying system is configured to convey order load carriers through the picking station;

wherein the first linear conveying system and the second linear conveying system are arranged at an intersecting angle to each other and are controlled by a controller to provide a continuous conveyance flow of the product load carriers and the order load carriers through the picking station.

14. The picking station as claimed in claim 13, further comprising a discharging and gathering third conveying system for the product load carriers and the order load carriers, wherein the third conveying system is either inline with the first linear conveying system or the second linear conveying system.

15. The picking station as claimed in claim 13, further comprising a parallel inbound load carrier conveyor section comprising conveyor positions behind put positions on the second linear conveyor system that is configured for use as additional put positions.

16. The picking station as claimed in claim 13, further comprising temporary shelving in a raised position above/beyond an operator picking area.

17. The picking station as claimed in claim 13, wherein the first linear conveying system is configured to tilt the product load carriers towards an operator and/or the second linear conveying system is configured to tilt the order load carriers towards the operator.

18. The picking station as claimed in claim 17, wherein the first linear conveying system and/or the second linear conveying system comprises a tilted RAT (Right Angle Transfer) in which only a corresponding pick/put position may be tilted providing the operator an indication where the articles are to be picked from and/or where picked articles are to be put to.

19. The picking station as claimed in claim 17, wherein the first linear conveying system and/or the second linear conveying system comprises a tiltable conveyor section and further comprises a bumper to absorb impacts when respective ones of the product load carriers and/or order load carriers are is pushed onto the tilted conveyor section.

* * * * *